United States Patent
Tayama

(10) Patent No.: US 6,625,580 B1
(45) Date of Patent: *Sep. 23, 2003

(54) WIRELESS ORDER AND DELIVERY SYSTEM

(75) Inventor: Hideyuki Tayama, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/154,519

(22) Filed: Sep. 16, 1998

(30) Foreign Application Priority Data

May 20, 1998 (JP) .......................... 10-138853

(51) Int. Cl.[7] .............................. G06F 17/60
(52) U.S. Cl. ...................... 705/26; 705/20; 705/22; 705/23; 705/21; 235/375; 235/383; 235/385
(58) Field of Search .............. 705/20–23, 26; 235/375, 383, 385

(56) References Cited

U.S. PATENT DOCUMENTS

| | | | |
|---|---|---|---|
| 5,003,472 A | * | 3/1991 | Perrill et al. ................. 235/375 |
| 5,235,509 A | * | 8/1993 | Mueller et al. ............... 705/15 |
| 5,310,997 A | * | 5/1994 | Raoch et al. ................. 235/375 |
| 5,434,394 A | * | 7/1995 | Raoch et al. ................. 235/375 |
| 5,595,264 A | * | 1/1997 | Trotta, Jr. ..................... 186/56 |
| 5,640,002 A | * | 6/1997 | Ruppert et al. ............. 235/472 |
| 5,664,110 A | * | 9/1997 | Green et al. ................. 705/26 |
| 5,734,839 A | * | 3/1998 | Enoki et al. ................. 705/20 |
| 5,804,807 A | * | 9/1998 | Murrah et al. .............. 235/383 |
| 5,805,416 A | * | 9/1998 | Friend et al. ............... 361/686 |
| 5,838,798 A | * | 11/1998 | Stevens, III ................. 380/49 |
| 5,845,263 A | * | 12/1998 | Camaisa et al. ............ 705/27 |
| 5,859,414 A | * | 1/1999 | Grimes et al. .............. 235/383 |
| 5,880,449 A | * | 3/1999 | Teicher et al. .............. 235/383 |
| 5,939,695 A | * | 8/1999 | Nelson ........................ 235/383 |
| 5,969,968 A | * | 10/1999 | Pentel ......................... 235/381 |

FOREIGN PATENT DOCUMENTS

| | | |
|---|---|---|
| JP | 5-151462 | 6/1993 |
| JP | 5151462 | 6/1993 |
| JP | 793400 | 4/1995 |
| JP | 7-93400 | 4/1995 |
| JP | 08030847 A | 2/1996 |
| JP | 09097382 A | 4/1997 |

OTHER PUBLICATIONS

Brown, Jim; EDI Quick Response Keeps Retailers' Shelves Stocked; Network World, FraminghamOct. 10, 1988; vol. 5, Iss. 41; p. 4, 2 pgs.*

Segel, Joseph; The Information Superhighway—Seperating hype from Reality, Executive Speeches v9n2 Oct./Nov. 1994.*

Bennett, Stephen; Electronic Home Shopping: which way to the future; Progressive Grocessor, v67, n5, May, 1989.*

Gladson, Ted R.; Cost and technology will lead the way.; Drug Topics, v128, p84(3), Apr. 1984.*

* cited by examiner

Primary Examiner—Hani M. Kazimi
Assistant Examiner—Jagdish Patel
(74) Attorney, Agent, or Firm—Staas & Halsey LLP

(57) ABSTRACT

A store system has a goods display area for displaying samples of goods, and a goods storage for stocking the goods to be handed, whereby a waiting time till the goods are received is reduced. A customer holds a goods input device. The goods storage is provided with a goods indicator. The customer inputs data about the want-to-get goods through the goods input device. The goods data inputted are wirelessly transmitted to the goods indicator in the goods storage. The goods indicator indicates a store clerk to immediately prepare the goods. It is therefore feasible to save a labor to carry the goods to the cash register and prepare the goods per input of the goods. Accordingly, the waiting time till the goods are received can be reduced.

8 Claims, 9 Drawing Sheets

FIG. 2
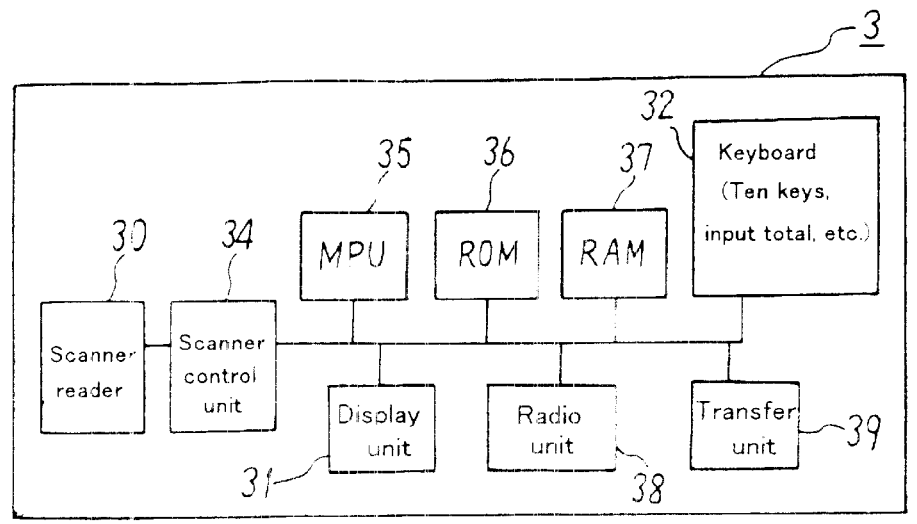
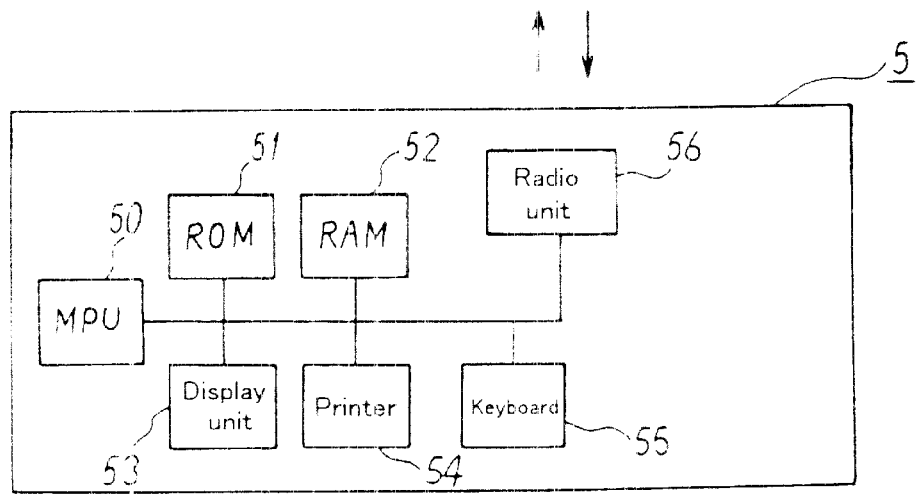
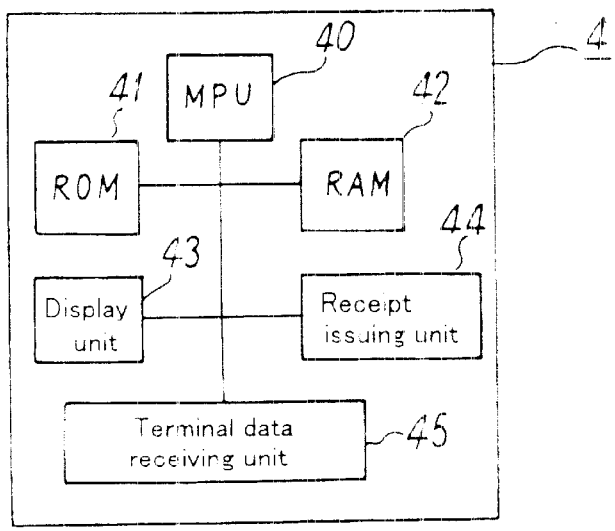

WIRELESS ORDER AND DELIVERY SYSTEM

BACKGROUND OF THE INVENTION

1. Field of the Invention

The present invention relates generally to a store system utilized for purchasing goods desired by a customer in a store and, more particularly, to a store system utilized in a store having a goods display area in which the goods are displayed, and a goods storage for stocking the goods.

2. Description of the Related Art

A variety of goods are displayed in a store such as a supermarket etc. A customer, when purchasing the goods in the store, takes the goods out of a display rack in the store and thereafter brings the goods to a cash register. Then, a store clerk inputs an amount of money of the goods to the cash register, and the customer pays a total amount of money, thus settling the payment. This type of stores system is disclosed in Japanese Patent Application Laid-Open Publication No. 9-97832.

Having an insight into a goods purchasing trend in recent years, however, in the great majority of cases a large quantity goods are bought in the supermarket etc. Further, there are large-sized commodities. In such a case, it is very inconvenient for the customer to bring the purchased goods to the cash register. What is therefore demanded is a system for saving the labor to carry the goods to the cash register.

FIG. 9 is an explanatory diagram showing the prior art.

A store system shown in FIG. 9 is proposed as a system for saving the labor to carry the goods within the store (see, e.g., Japanese Patent Application Laid-Open Publication No. 8-30847). According to this store system, the store includes a goods display area 90 for displaying goods samples 91, and a goods storage 94 for stocking real goods 96. The respective goods samples 91 are displayed in the goods display area 90.

A customer 97 is asked to hold a goods input device 92 for inputting goods codes. The customer 97 inputs to the goods input device 92 the goods codes of the goods to be purchased in the goods display area 90. The goods input device 92 memorizes the goods codes. Then, the customer 97, when shopping is finished, brings the goods input device 92 to the cash register 93. The cash register 93 takes in the goods data on the goods input device 92, and calculates a total amount of money. The customer looks at this amount of money, and then settles the payment.

On the other hand, a goods indicator 95 is connected to the cash register 93. This goods indicator 95 is provided in the goods storage 94. The cash register 93 transfers to the goods indicator 95 th e data of the goods a payment of which has already been settled. The goods purchased by the customer are displayed on the goods indicator 95. The store clerk in the store, upon looking thereat, takes goods 96 out of the goods storage 94 and transfers the goods 96 to the customer.

According to this construction, the customer specifies the goods, and the store clerk carries the goods from the goods storage. The customer is therefore able to save a labor to walk carrying the goods to the cash register. It is therefore feasible for the customer to save the labor even when purchasing a large quantity of goods or large commodities.

There arise, however, such a problem inherent in the prior art that the take-out of the goods is indicated after settling the payment at the cash register, and hence it takes a long time to receive the goods in the case of purchasing a multiplicity of goods, resulting in a defect of keeping the customer waiting long.

SUMMARY OF THE INVENTION

It is a primary object of the present invention to provide a store system, having no necessity for a customer to carry goods, for reducing a time till the goods are received.

It is another object of the present invention to provide a store system, having no necessity for the customer to carry the goods even when purchasing a large quantity of goods, for reducing the time till the goods are received.

To accomplish the above objects, a store system according to the present invention comprises a goods input device, operated by the customer, for inputting data of desired goods among the goods displayed in a goods display area, a cash register for settling a payment of the inputted goods, and a goods indicator, provided in a goods storage for stocking the goods, for indicating the goods inputted by the goods input device to a store clerk in charge. The data of the inputted goods are wirelessly transmitted to the goods indicator per input of the goods data in the goods input device, and the goods are indicated by the goods indicator.

According to the present invention, samples of the goods are displayed in a goods display area, and the goods to be handed are stocked in the goods storage. The customer holds the goods input device. The goods storage is provided with the goods indicator. The customer inputs the data of the goods to be purchased through the goods input device. The goods data inputted are wirelessly transmitted to the goods indicator in the goods storage. The goods indicator indicates a clerk to immediately prepare the goods.

It is therefore feasible to save a labor to carry the goods to the cash register and prepare the goods per input of the goods. Accordingly, the time till the goods are received can be reduced.

Further, according to one aspect of the invention, the goods input device includes an input unit for inputting goods codes of the goods, a display unit for displaying a price of the goods with the goods codes inputted, and a radio unit for wirelessly transmitting the inputted goods codes to the goods indicator.

According to another aspect of the present invention, the goods input device includes a reader for reading the goods codes of the goods.

According to still another aspect of the present invention, the goods input device includes a confirmation key for indicating said radio unit to transmit the inputted goods codes to the goods indicator.

According to yet another aspect of the present invention, the reader is constructed of a bar code reader for reading the bar codes of the goods.

According to a further aspect of the present invention, the goods input device further includes a key unit for inputting the number of goods, and the radio unit transmits the goods codes and the number of the goods.

According to a still further aspect of the present invention, the goods input device includes a memory for storing the goods codes inputted, and a calculating unit for calculating a total amount of money of the goods stored in the memory.

According to a yet further aspect of the present invention, the goods input device includes a transferring unit for transferring contents in the memory to the cash register.

According to an additional aspect of the present invention, the goods indicator includes an outputting unit for outputting information on the goods transmitted.

According to another additional aspect of the present invention, the cash register, after executing a payment settling process based on the goods data in the goods input device, issues an exchange sheet for an exchange for the goods.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which:

FIG. 2 is a block diagram in one embodiment of the present invention;

DETAILED DESCRIPTION OF THE PREFERRED EMBODIMENTS

Figure 1:
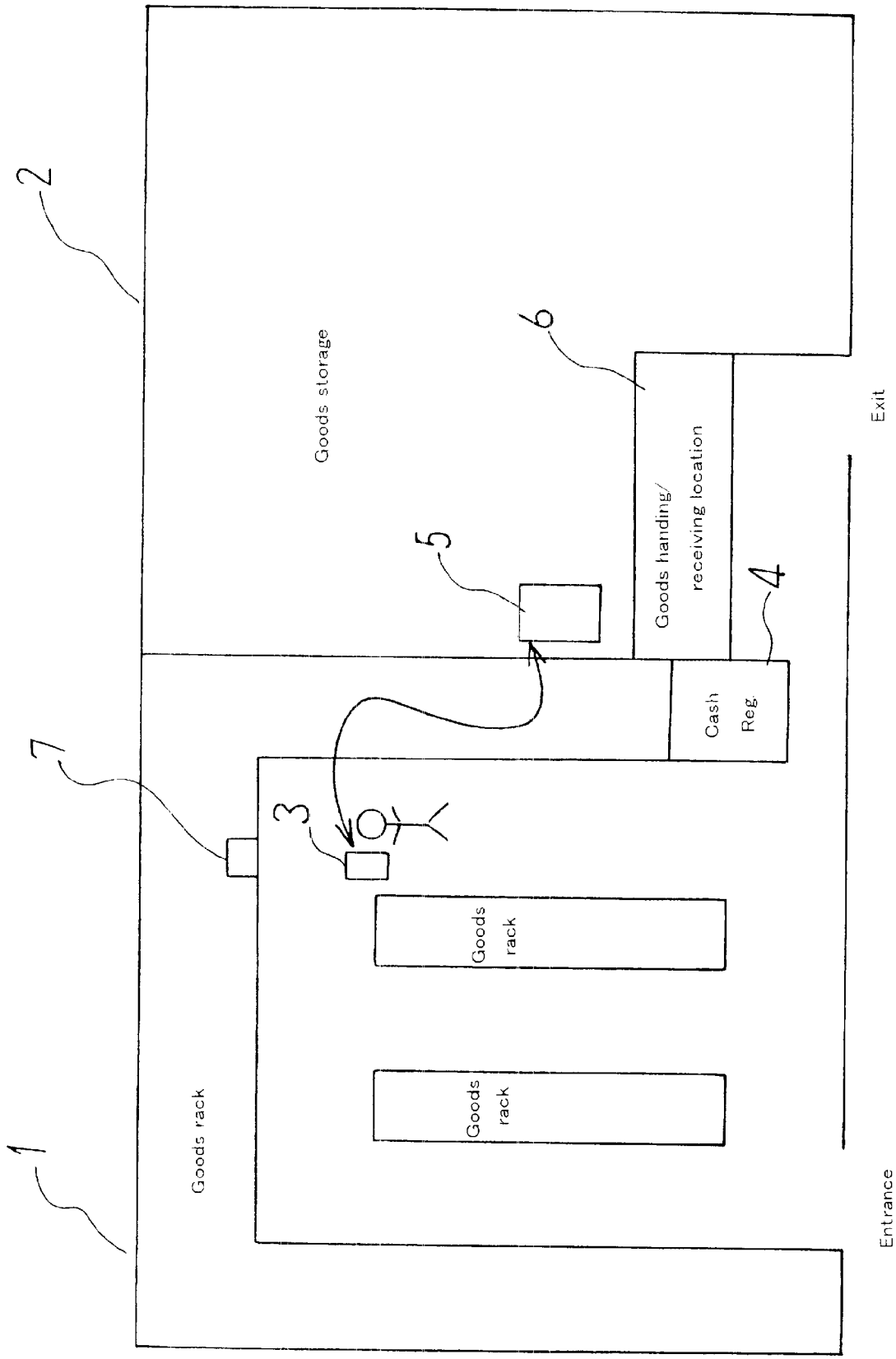
FIG. 1 is a diagram showing a system architecture in one embodiment of the present invention.

FIG. 1 is a diagram showing a system architecture in one embodiment of the present invention.

As illustrated in FIG. 1, a store includes a goods display area 1 for displaying samples of goods, and a goods storage 2 for stocking the goods. The goods display area 1 is furnished with goods racks which accommodate a multiplicity of goods samples 7. The goods storage 2 is stocked with real goods.

The goods samples 7 are printed with bar codes for indicating the goods.

A goods input device 3 is operated by the customer and serves to input data of the goods the customer desires to buy. A cash register 4 is provided at an exit of the goods display area 1, receives an input of the goods data from the goods input device 3, and issues a receipt after settling the payment thereof. A goods indicator 5 is provided in the goods storage 2, receives the goods data inputted to the goods input device 3, and indicates the clerk to prepare the goods at a goods handing/receiving location 6. The goods input device 3 is wirelessly connected to the goods indicator 5.

The customer who enters the store via an entrance receives the goods input device 3. The goods input device 3 is provided with a bar code reader for reading the bar codes etc of the goods. The customer operates the goods input device 3, reads the bar codes of the goods to be purchased, and inputs a numerical quantity thereof.

The goods input device 3 is provided with a wireless transmitter. The goods data inputted are immediately transmitted to the goods indicator 5. The goods indicator 5 outputs the goods data to a display or a printer. In the storage, the store clerk takes the goods out of the goods storage 2 referring to the goods data outputted, and prepares the goods at the goods handing/receiving location 6.

The customer, after the end of inputting the data of the goods to be purchased, brings the goods input device 3 to the cash register 4. The cash register 4 reads the goods data in the goods input device 3, and executes a payment settling process. Then, the cash register 4 issues a receipt. The customer, after settling the payment at the cash register 4, moves to the goods handing/receiving location. Then, the customer shows the receipt to the store clerk and receives the goods.

A total amount of money is calculated by the goods input device 3. Therefore, the customer is able of implement the payment settling process without waiting at the cash register 4. Further, every time the goods data are inputted by the goods input device 3, the goods data are transmitted to the goods indicator 5. The goods indicator 5 outputs the goods data, and hence the store clerk is able to promptly prepare the goods. Accordingly, the customer is, immediately after settling the payment at the cash register 4, able to receive the goods.

Figure 3:
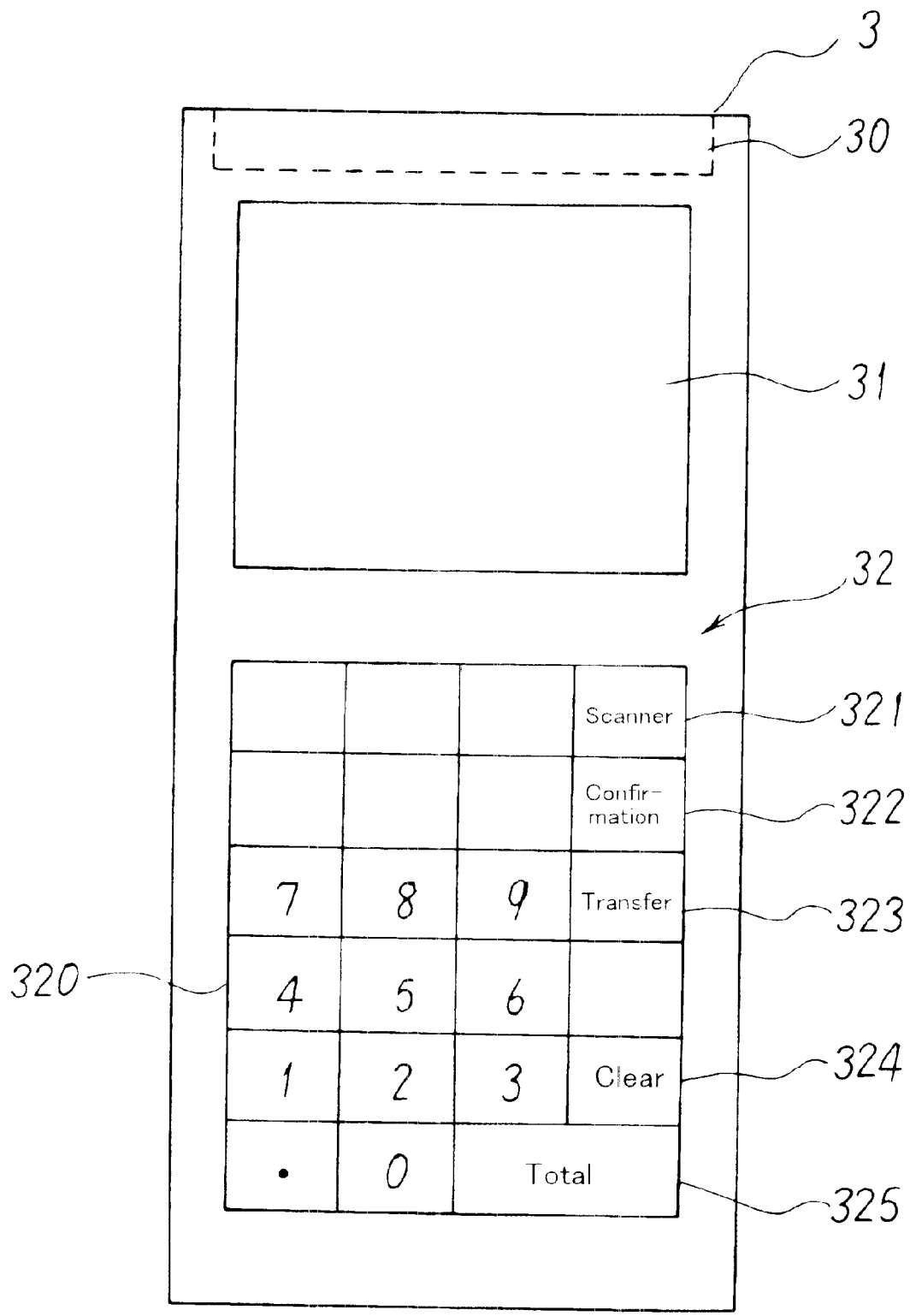
FIG. 3 is a view showing an external configuration of a goods input device in FIG. 2.
Figure 4:
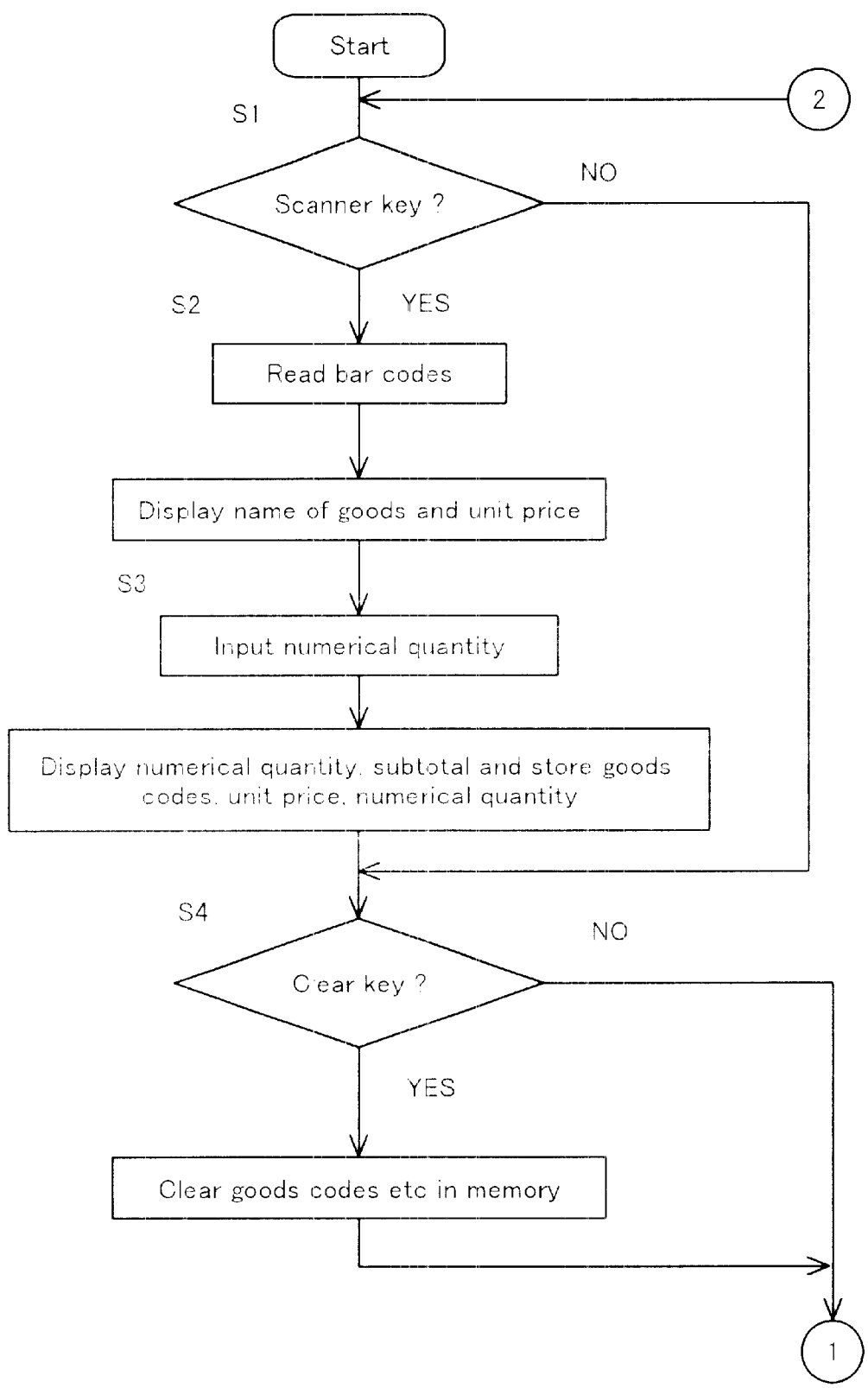
FIG. 4 is a flowchart (part 1) showing a goods input process by a goods input device in FIG. 2.
Figure 5:
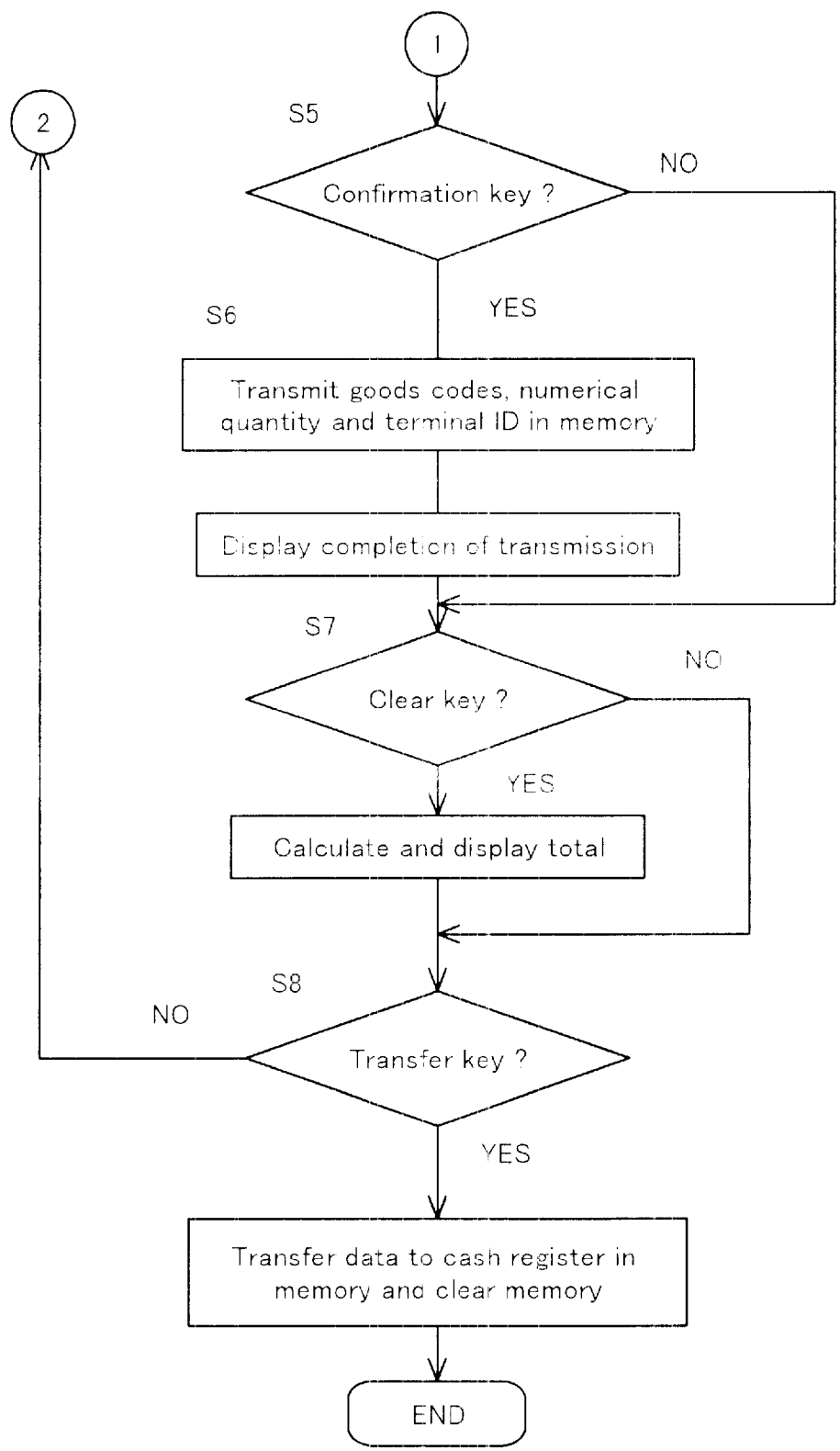
FIG. 5 is a flowchart (part 2) showing the goods input process by the goods input device in FIG. 2.

FIG. 2 is a block diagram showing one embodiment of the present invention. FIG. 3 is a view showing a external configuration of the goods input device in FIG. 2. FIGS. 4 and 5 are flowcharts showing goods input processes by the goods input device in FIG. 2.

As shown in FIG. 2, the goods input device 3 includes a scanner reader 30 for scanning and reading the bar codes on the goods, and a scanner control unit 34 for controlling the scanner reader 30. The goods input device 3 has a microprocessor (MPU) 35, a read-only memory (ROM) 36, a random access memory (RAM) 37, a key inputting unit 32, a display unit 31, a radio unit 38, and a data transferring unit 39.

The MPU 35 controls the respective units in accordance with key operations of a key Input unit 32. The ROM 36 is stored with programs and data required for operating the MPU 35. The ROM 36 is further stored with a goods table stored with prices of the goods corresponding to the goods codes. The RAM 37 is stored with the goods data inputted.

The key input unit 32 has, as shown in FIG. 3, ten keys 320, and a variety of function keys 321–325. The function keys are a scanner key 321 for indicating the scanner 30 to read, a confirmation key 322 for confirming the goods data, a transfer key 323 for giving an indication of a data transfer to the cash register 4, a clear key 324 for giving an indication to clear the input data, and a total key 325 for giving an indication to calculate a total amount of money.

The display unit 31 displays the input data etc. The radio unit 38 wirelessly transmits the goods data to the goods indicator 5. The radio unit 38 is constructed of an infrared-ray transmitter etc. The data transfer unit 39 transfers the goods data in the RAM 37 to the cash register 4.

The goods indicator 5 includes a microprocessor (MPU) 50, a read-only memory (ROM) 51, a random access memory (RAM) 52, a display unit 53, a printer 54, a keyboard 55, and a radio unit 56.

The MPU 50 controls the output of the goods data received from the radio unit 56. The ROM 51 is stored with the programs and data required for operating the MPU 50. The RM 52 is stored with the goods data received. The display unit 53 displays the goods data received. The printer 54 prints the goods data received. The keyboard 55 executes necessary inputting processes. The radio unit 56 receives the goods data transmitted from the goods input device 3.

The cash register 4 has a microprocessor (MPU) 40, a read-only memory (ROM) 41, a random access memory (RAM) 42, a display unit 43, a receipt issuing unit 44 and a data receiving unit 45.

The MPU 40 controls the payment settling process of the cash register. The ROM 41 is stored with programs and data needed for operating the MPU 40. The RSM 42 is stored with the goods data transferred. The display unit 43 displays a total amount of money and a change etc. The receipt issuing unit 44 issues and prints a receipt corresponding to the goods data transferred. The data receiving unit 45 receives the goods data transferred from the goods input unit 3.

An operation of the goods input device 3 will be explained with reference to FIGS. 4 and 5.

(S1) the MPU 35 checks whether or not the scanner key 321 is pushed. The MPU 35, when judging that the scanner key 321 is not pushed, proceeds to step S4 in FIG. 4.

(S2) The customer makes the scanner reader 30 of the goods input device 3 approach to the bar codes of the goods to be purchased, and pushes the scanner key 321. The MPU 35, when judging that the scanner key 321 is pushed, indicates the scanner control unit 34 to read the bar codes. The scanner reader 30 thereby reads the bar codes of the goods. The MPU 35 refers to the goods table of the ROM 36 and thus obtains a price of the goods identical with the bar codes (goods codes) read. Then, the goods codes and the price are displayed on the display unit 31.

(S3) The customer inputs the numerical quantity of the goods through the ten keys 320 of the key input unit 32. The MPU 35 makes the inputted numerical quantity and a subtotal of money displayed on the display unit 31. Then, the RAM 37 is stored with the goods codes, the unit price and the numerical quantity.

(S4) The customer makes a judgement about an input content by seeing the display contents (the numerical quantity, and the subtotal). The customer, if the input content is incorrect, pushes the clear key 324. The MPU judges whether or not the clear key 324 of the key input unit 32 is pushed. If the clear key 324 is not pushed, the MPU 35 proceeds to a step S5. While on the other hand, the MPU 35, when judging that the clear key 324 is pushed, clears the goods codes, the unit price and the numerical quantity which are stored in the RAM 37. Then, the MPU 35 advances to step S5.

(S5) The MPU 35 judges whether or not the confirmation key 322 of the key input unit 32 is pushed. The customer, if the input content is correct by seeing the display contents on the display unit 31, pushes the confirmation key 322. If the confirmation key 322 is not pushed, the MPU proceeds to step S7.

(S6) The MPU 35, when judging that the confirmation key 322 is pushed, wirelessly transmits from the radio unit 38 the goods codes, the numerical quantity and a terminal identification number (ID) in the RAM 37. The transmitted data are received by the radio unit 56 of the goods indicator 5, and are outputted to the display unit 53 and the printer 54 of the goods indicator 5. The confirmed goods can be thereby prepared in the goods storage 2. The terminal ID is outputted, and hence the goods are prepared per terminal ID. The MPU 35, upon a completion of the transmission, makes the completion of the transmission displayed on the displayed unit 31. With this display, the customer is able to know the completion of the transmission.

(S7) The MPU 35 judges whether or not the total key 325 of the key input unit 32 is pushed. The customer, when desiring to know the total amount of money, pushes the total key 325. If the total key 325 is not pushed, the MPU advances to step S8. If the total key 325 is pushed, the MPU 35 calculates a total of all the goods stored in the RAM 37. Then, the MPU 35 makes this total amount of money displayed on the display unit 31.

(S8) The MPU 35 judges whether or not the transfer key 323 of the key input unit 32 is pushed. The customer finishes shopping and brings the goods input device 3 to the cash register 4. Then, the store clerk receives the goods input device 3, and pushes the transfer key 323. If the transfer key 323 is not pushed, the MPU returns to step S1. If the transfer key 323 is pushed, the MPU 35 transfers from the transferring unit 39 the goods codes, the numerical quantities, the prices and the total of all the goods stored in the RAM 37 to the cash register 4. Then, the RAM 37 is cleared.

In the cash register 4, the RAM 42 retains the goods data, and receipt issuing unit 44 prints on the receipt the goods codes, the unit prices, the numerical quantities and subtotals and the total of the respective goods. This receipt serves as a goods exchange sheet. The terminal ID is printed on this receipt. At the goods handing/receiving location 6, the exchange number is identified with the terminal ID on this receipt, and the goods are handed to the customer.

Thus, when the customer inputs the goods data, the goods data are immediately transferred to the goods storage 2. In the goods storage 2, the goods indicated by the goods data can be thereby prepared. Therefore, the goods can be received by the customer without the customer carrying the goods. Further, since the goods are prepared per input of the goods, the customer, after settling the payment at the cash register 4, has no necessity for waiting for the goods to be transferred and received.

Figure 6:
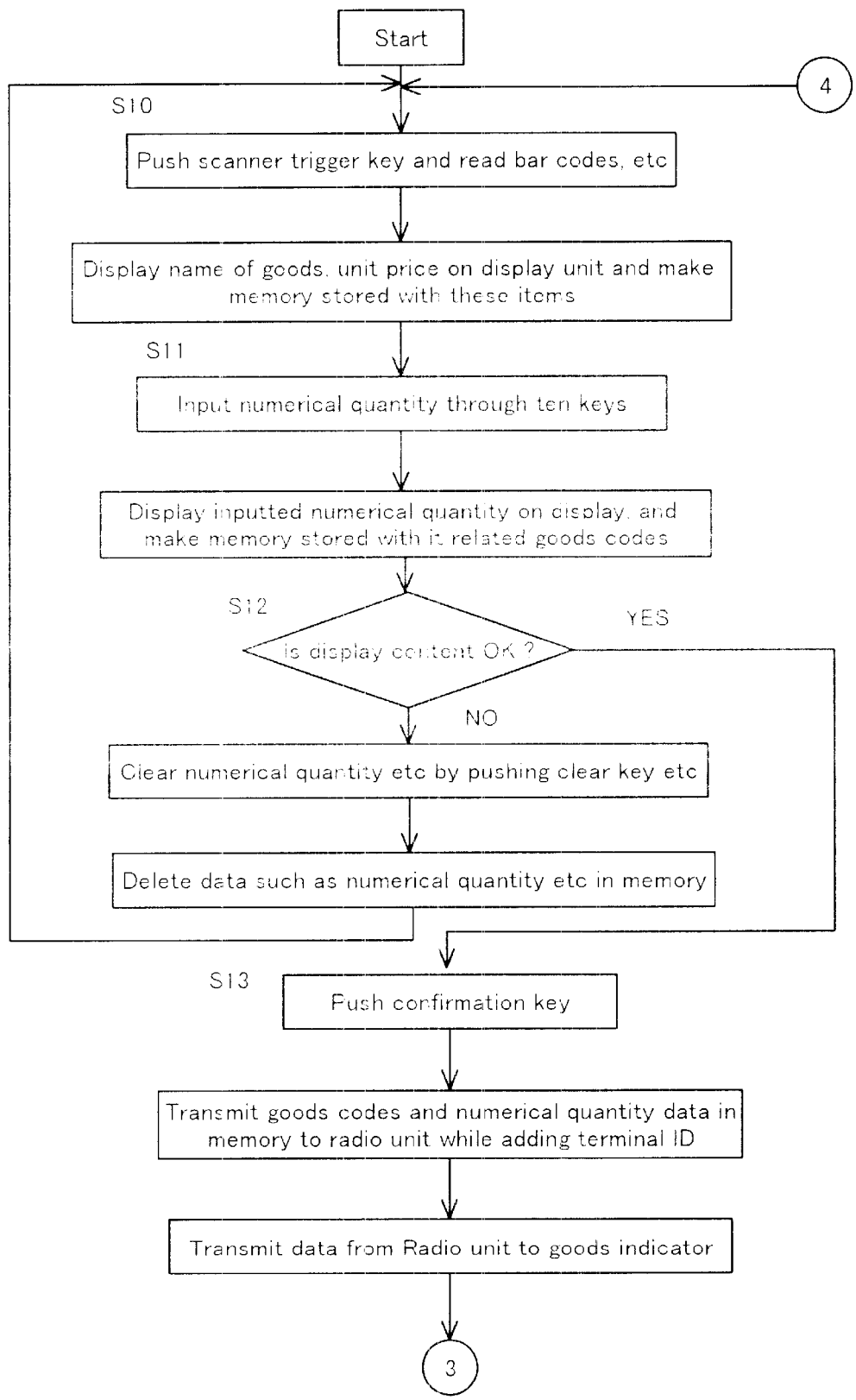
FIG. 6 is a flowchart (part 1) showing a registering operation in the system in FIG. 2.
Figure 7:
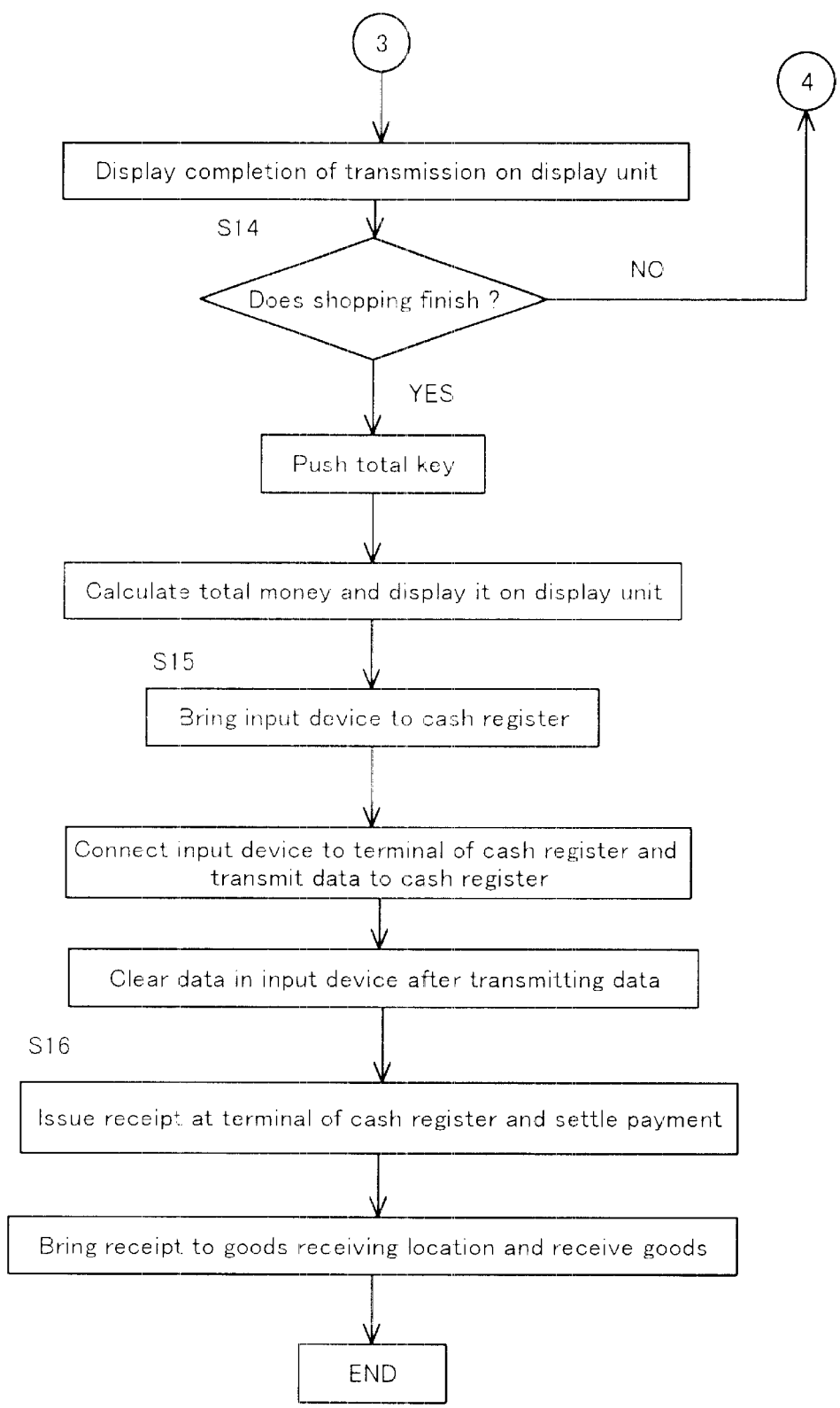
FIG. 7 is a flowchart (part 2) showing the registering operation in the system in FIG. 2.
Figure 8:
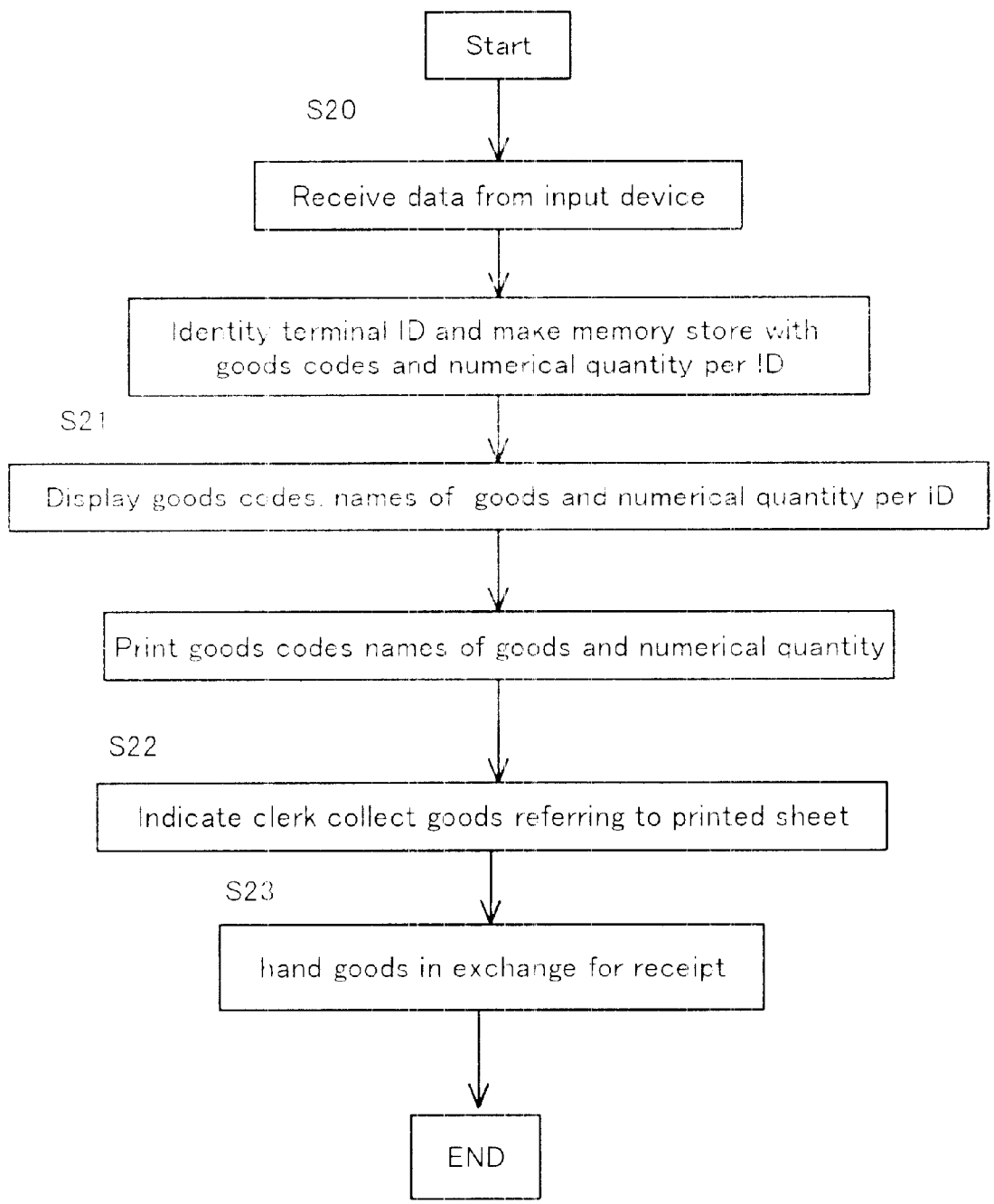
FIG. 8 is a flowchart showing an operation of a goods indicator in FIG. 2.
Figure 9:
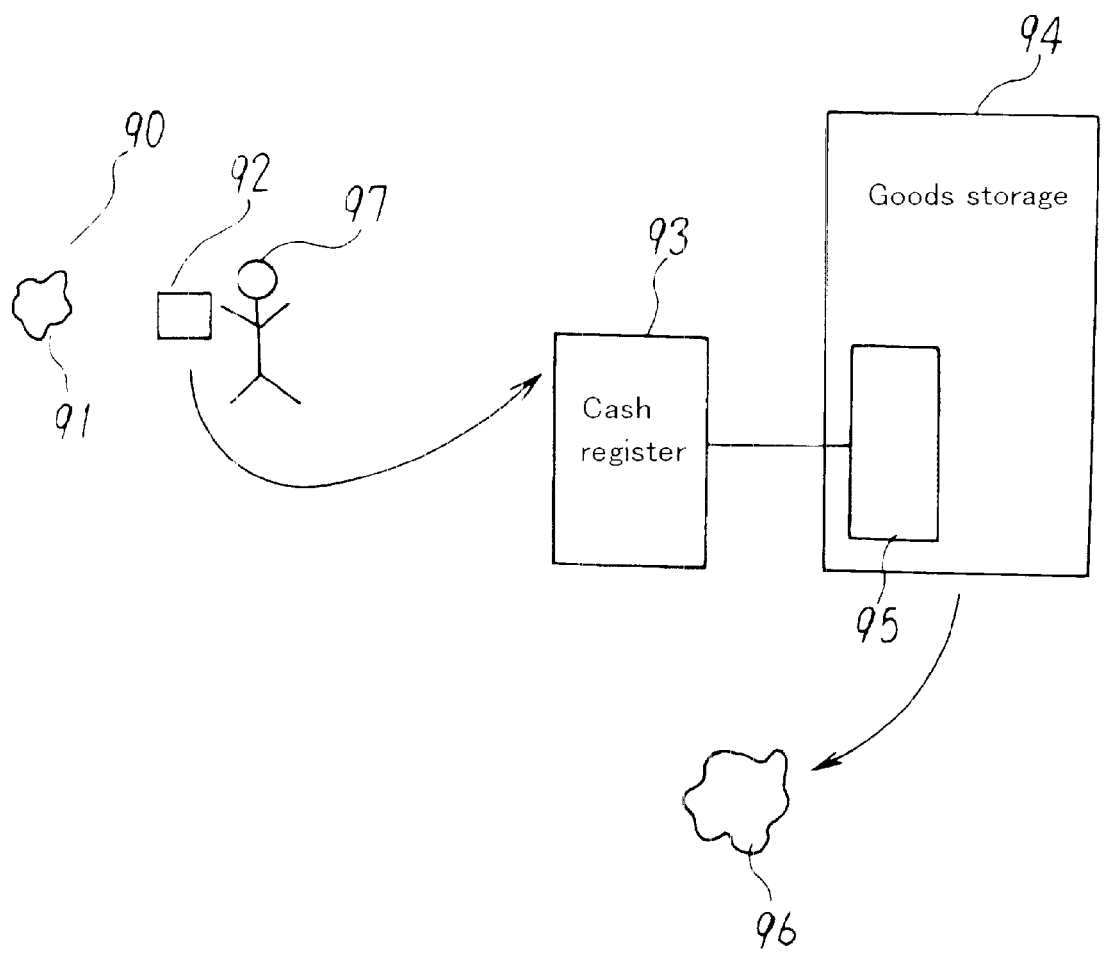
FIG. 9 is an explanatory diagram showing the prior art.

FIGS. 6 and 7 are flowcharts showing operation processes by the customer in one embodiment. FIG. 8 is a flowchart showing operation processes by the store clerk in the goods storage.

(S10) The customer pushes the scanner key 321 of the goods input device 3, and reads the bar codes of the goods. The MPU 35 of the goods input device 3 refers to the goods table of the ROM 36, and thus obtains a price of the goods identical with the read bar codes (the goods codes). Then, the name of goods and the price are displayed on the display unit 31. The goods codes and the price are stored in the RAM 37.

(S11) The customer inputs the numerical quantity of the goods through the ten keys 320 of the key input unit 32. The MPU 35 makes the inputted numerical quantity and subtotal of money displayed on the displayed unit 31. Then, the goods codes, the unit price and the numerical quantity are stored in the RAM 37.

(S12) The customer, makes a judgement about the input content by seeing the display contents (the numerical quantity and the subtotal) on the display unit 31. The customer, if the input content is incorrect, pushes the clear key 324. When the clear key 324 is pushed, the goods codes, the unit price and the numerical quantity, which are stored in the RAM 37, are cleared. Then, the processing is returned to step S10.

(S13) The customer confirms that the input content is correct by seeing the display contents on the display unit 31, and pushes the confirmation key 322. Upon pushing the confirmation key 322, the goods codes, the numerical quantity and the terminal identification number (ID) in the RAM 37 are transmitted to the radio unit 38, and then transmitted from the radio unit 38 to the radio unit 56 of the goods indicator 5. With this operation, as will be described later on, the goods confirmed can be prepared in the goods storage 2. Upon a completion of the transmission, the completion of the transmission is displayed on the display unit 31. Through this display, the customer is able to know the completion of the transmission.

(S14) The customer, when wishing to finish shopping, pushes the total key 325. When the shopping is not ended, the processing is diverted back to S10. When pushing the total key 325, the MPU 35 calculates a total of all the goods stored in the RAM 37. Then, the MPU 35 makes this total amount of money displayed on the display unit 31.

(S15) The customer finishes shopping and brings the goods input device 3 to the cash register 4. Then, the store clerk receives the goods input device 3 and connects the input device 3 to the cash register 4. The goods codes, the numerical quantities, the prices and the total of all the goods which are stored in the goods input device 3, are transferred to the cash register 4. Then, the RAM 37 is cleared.

(S16) In the cash register 4, the RAM 42 retains the goods data, and the receipt issuing unit 44 prints on a receipt the goods codes, the unit prices, the numerical quantities, the subtotals and the total of the respective goods. The receipt is, after through the payment settling process, handed to the customer. This receipt serves as an exchange sheet of the goods. The terminal ID is printed on this receipt. At the goods handing/receiving location 6, the exchange number is identified with the terminal ID on this receipt, and the goods are handed to the customer.

Thus, the goods data are transferred to the goods storage 2 and outputted per input of the goods. Hence, the goods can be prepared at the goods handing/receiving location per input of the goods. The customer is therefore able to receive the goods without waiting after settling the payment.

Next, an operation of the goods indicator will be explained with reference to FIG. 8.

(S20) When the goods data are received from the goods input device 3 via the radio unit 56 of the goods indicator 5, the MPU 50 identifies the terminal ID, and makes the RAM 52 stored with the goods codes and the numerical quantity per ID.

(S21) The MPU 50 makes the goods codes, names of the goods and the numerical quantities displayed on the display unit 53 per ID. With this display, the MPU 50 outputs the goods codes, the names of the goods and the numerical quantities per ID through the printer 54.

(S22) The store clerk in the goods storage 2 observes the thus printed and outputted sheet, and prepares the goods at the goods handing/receiving location 6 out of the goods storage 2. Since the terminal ID is outputted, the goods are prepared per terminal ID.

(S23) The store clerk hands the goods to the customer in exchange for the customer s receipt. At this time, the terminal ID is printed on the receipt, and hence the goods coincident with the terminal ID are handed to the customer.

In this way, in the goods storage 2, the goods can be prepared at the goods handing/receiving location 6 out of the goods storage 2 per input of the goods. The customer is therefore able to receive the goods without waiting after the end of shopping.

Further, the goods are handed in exchange for the receipt and hence can be handed to the customer who has finished settling the payment at the cash register. An act of handing the goods to a customer who does not vet settle the payment can be thereby prevented.

Moreover, the goods can be prepared per terminal ID, and the goods coincident with the terminal ID on the receipt can be handed. Therefore, even if a multiplicity of customers come shopping, the goods desired by the customers can be handed without any fault.

In addition to the embodiment discussed above, the following modifications may also be carried out.

(1) In the embodiment discussed above, the input of the goods codes involves the use of the bar codes, however, other identification codes readable by a machine can also be utilized.

(2) The receipt is used as the exchange sheet for the goods, however, an exchange tag etc for exchanging the goods may also be issued at the cash register.

(3) The terminal identification number is used as the exchange number, however, other numbers may also be utilized.

The present invention has been described so far by way of the embodiments but may be modified in many forms within the scope of the gist of the present invention, and these modifications may not be excluded from the range of the present invention.

As discussed above, the present invention exhibits the following effects.

(1) When the customer inputs the data of the goods to be purchased through the goods input device, the goods data are wirelessly transmitted to the goods indicator in the goods storage, and hence the store clerk can be immediately indicated to prepare the goods. It is therefore feasible to save the labor to bring the goods to the cash register and simultaneously prepare the goods per input of the goods.

(2) Accordingly, the waiting time till the customer receives the goods can be reduced.

What is claimed is:

1. A store system utilized for a customer to purchase desired goods in a store, comprising:
   an ordering device, carried and operated by the customer, inputting data of desired goods among the goods displayed in a goods display area;
   a cash register settling payment of the inputted goods and issuing a receipt for payment for the goods upon which ID information for identifying the customer is printed; and
   a goods indicator, provided in a goods storage for stocking the goods, indicating the goods inputted by said ordering device to a store clerk in charge,
   wherein said ordering device wirelessly and immediately upon input transmits the data of the inputted goods to said goods indicator and said ID information to said goods indicator, said goods indicator outputs the goods data and said ID information, the goods are promptly prepared in accordance with the goods data by a store clerk upon receipt of the goods data, and the goods are provided to the customer from the goods storage in the store after the customer displays the receipt for payment which the ID information is printed, and wherein the total amount of money for goods is calculated by the ordering device and sent to the cash register.

2. A store system according to claim 1,
   wherein said ordering device includes a memory storing the data of said inputted goods and a transferring unit directly transferring contents in said memory to said cash register.

3. A store system utilized for a customer to purchase desired goods in a store, comprising:
  an ordering device inputting data of desired goods among the goods displayed in a good display area in said store;
  a cash register settling payment of the inputted goods and issuing a receipt for payment for the goods; and
  a goods indicator, provided in a goods storage for stocking the goods, indicating the inputted goods to a store clerk in charge,
  wherein said ordering device comprises a memory storing the data of said inputted goods and a transferring unit directly transferring said inputted data in said memory to said cash register, and
  wherein said ordering device wirelessly and immediately upon input transmits the data of the inputted goods to said goods indicator, said goods indicator outputs the goods data, the goods are promptly prepared in accordance with the goods data by a store clerk upon receipt of the goods data, and the goods are provided to the customer from the goods storage in the store after the customer displays the receipt for payment,
  and wherein said cash register includes:
    a data receiving unit for directly receiving said inputted and transferred data from said ordering device associated with said transferring unit and
    a processor for processing said settling based on said received data, and
  wherein the total amount of money for goods is calculated by the ordering device and sent to the cash register.

4. A store system utilized for a customer to purchase desired goods in a store, comprising:
  an ordering device inputting data of desired goods among the goods displayed in a good display area in said store and storing said inputted data;
  a cash register settling a payment of the inputted goods; and
  a goods indicator, provided in a goods storage for stocking the goods, indicating the inputted goods to a store clerk in charge,
  wherein said cash register, after executing a payment settling process based on the goods data in said ordering device, issues an exchange sheet upon which ID information for identifying the customer is printed and for exchange for the goods from said goods storage and wherein the goods are provided to the customer from a goods storage in the store after the customer displays the exchange sheet upon which the ID information is printed, wherein said ordering device wirelessly and immediately upon input transmits the data of the inputted goods and said ID information to said goods indicator, said goods indicator outputs the goods data and said ID information, the goods are promptly prepared in accordance with the goods data by a store clerk upon receipt of the goods data, and wherein the total amount of money for goods is calculated by the ordering device and sent to the cash register.

5. An order and delivery method comprising:
  inputting data of desired goods to an ordering device carried and operated by a customer and sending said inputted data and ID information for identifying the customer from said ordering device to a goods indicator included in a goods storage storing a plurality of goods;
  storing each of inputted goods data into a memory provided in said ordering device;
  calculating a total amount of money for goods stored in said memory;
  sending said calculated total and the terminal ID information from said ordering device to a cash register;
  settling a payment of goods based on said calculated data sent from said ordering device;
  issuing a receipt for payment for the goods upon which the ID information is printed using a cash register; and
  delivering said ordered goods picked up in said goods storage to said customer, wherein the goods are provided to the customer from said goods storage in the store after the customer displays the receipt for payment upon which the ID information is printed, and wherein said ordering device wirelessly and immediately upon input transmits the data of the inputted goods to said goods indicator, said goods indicator outputs the goods data, and the goods are promptly prepared in accordance with the goods data by a store clerk upon receipt of the goods data.

6. The order and delivery method according to claim 5, wherein:
  said settling comprises:
    electrically connecting a cash register and said ordering device carried by said customer.

7. An ordering device to be carried by a customer, comprising:
  input means for inputting goods data and ID information;
  a transmitter transmitting goods data and said ID information to identify the customer to a goods indicator when said goods data is inputted to said ordering device;
  a memory storing each of the inputted goods data; and
  a key operable by said customer to initiate transmitting said stored goods data and said ID information by said ordering device to a cash register, said ordering device wirelessly and immediately upon input transmits the data of the inputted goods and said ID information to a goods indicator, said goods indicator outputs the goods data and said ID information, the goods are promptly prepared in accordance with the goods data by a store clerk upon receipt of the goods data, and the goods are provided to the customer from the goods storage in the store after the customer displays a receipt for payment upon which the ID information is printed by said cash register.

8. An order and delivery method comprising:
  sending inputted goods data and terminal ID information from an ordering device to a goods indicator;
  displaying goods data received from said ordering device onto the goods indicator;
  storing each of inputted goods data into a memory provided in said ordering device;
  calculating total amount of money for goods stored in said memory;
  sending said calculated total and the terminal ID information from said ordering device to a cash register;
  settling a payment of goods based on said calculated data sent from said ordering device;
  issuing a receipt for said payment which terminal ID information is printed; and
  providing goods in which the customer purchased when the customer displayed said receipt to a store clerk, and wherein said ordering device wirelessly and immediately upon input transmits the data of the inputted goods to said goods indicator, said goods indicator outputs the goods data, the goods are promptly prepared in accordance with the goods data by a store clerk upon receipt of the goods data, and the goods are provided to the customer from the goods storage in the store after the customer displays the receipt for payment.

\* \* \* \* \*